United States Patent Office 3,476,791
Patented Nov. 4, 1969

---

3,476,791
o-THIOCARBAMOYL BENZOIC ACID ESTERS
Melvin S. Newman, Columbus, Ohio, and Harold A. Karnes, Portage, Mich., assignors to The Board of Trustees of Ohio State University, Columbus, Ohio, an institution of higher learning of Ohio
No Drawing. Filed May 4, 1966, Ser. No. 547,433
Int. Cl. C07c *154/00*
U.S. Cl. 260—455                                   4 Claims

---

ABSTRACT OF THE DISCLOSURE

A process for producing aromatic N,N-disubstituted thioncarbamates by heating the corresponding thiolcarbamates. The esters of the O-carboxyphenyl N,N-disubstituted thiolcarbamates produced by that process are useful as intermediates in the production of saccharin.

---

This invention relates to novel processes for producing organic compounds, and is more particularly concerned with processes for producing certain aromatic N,N-disubstituted thiolcarbamates. This invention also relates to novel organic compounds, and is more particularly concerned with certain novel thioncarbamates and novel thiolcarbamates useful as intermediates in the production of saccharin.

One aspect of this invention relates to a process for transforming a thioncarbamate to a thiolcarbamate, each molecule of said thioncarbamate containing at least one thiocarbamoyloxy moiety of the formula:

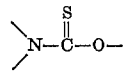

I wherein the O is attached to an aromatic ring carbon atom and wherein the N is attached to two different carbon atoms each of which either is saturated with hydrogen atoms, other carbon atoms, or a combination of those, or is an aromatic ring carbon atom, and each molecule of said thiolcarbamate containing at least one carbamoylthio moiety of the formula:

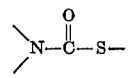

II wherein the S is attached to an aromatic ring carbon atom and wherein the two attachments to N are as defined above, which comprises maintaining said thioncarbamate at an elevated temperature until a substantial proportion of its thiocarbamoyloxy moieties of Formula I are transformed by rearrangement to carbamoylthio moieties of Formula II, said thioncarbamate being otherwise substantially unchanged by heat at said elevated temperature.

An example of that aspect of this invention is the transformation of p-nitrophenyl dimethylthioncarbamate to p-nitrophenyl dimethylthiolcarbamate in substantially quantitative yield by heating the former at about 185° C. for 25 minutes. In terms of structural formulas, that transformation is as follows:

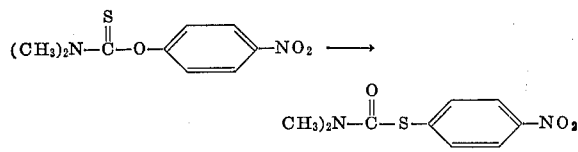

Additional examples are set forth hereinafter.

Aromatic thiolcarbamates with one or more Formula II carbamoylthio moieties as above defined are known in the art and are useful for a wide variety of purposes, including use as herbicides, defoliants, fungicides, nematocides, acaricides, and central nervous system stimulants. See, for example, U.S. Patents 2,553,994, 2,977,- 209, 2,983,747, and 2,990,319; British Specification 862,- 548; German Patentschrift 961,042; J. Org. Chem. 26, 4756 (1961); Monatsh. 84, 518, (1953).

Prior art methods for producing the aromatic N,N-disubstituted thiolcarbamates defined above each involve use of a reactant containing a divalent sulfur atom bonded to an aromatic ring carbon atom. See, for example, Reid, "Organic Chemistry of Bivalent Sulfur," Chemical Publishing Co., Inc., New York, N.Y., vol. IV, pp. 198–201 (1962). Especially common reactants are the thiophenols, ArSH, wherein Ar is an aromatic moiety attached to the SH moiety through an aromatic ring carbon atom. So the problems of producing the aromatic N,N-disubstituted thiolcarbamates defined above are usually linked to the well-known economic and manipulative difficulties in producing thiophenols.

In the novel process of this invention, the desired aromatic N,N-disubstituted thiolcarbamate is produced directly, easily, and in high yield from an aromatic N,N-disubstituted thioncarbamate, a compound which contains no Ar—S bonds. The necessary thioncarbamate reactant contains at least one Ar—O bond and, during this novel process, each Ar moiety moves from O to S to form one of the desired Ar—S bonds.

Aromatic N,N-disubstituted thioncarbamate reactants as defined above are known in the art. See, for example, U.S. Patents 2,990,319 and 3,217,002; British Specification 912,895; German Patentschrift 20,331; French Patent 2,112M; Belgian Patent 627,322; Japanese Patents 20130/63, 11213/64, 11497/65, 18300/65, 1830/65, 18302/65, and 18303/65; J. Am. Chem. Soc. 79, 747 (1957); Can. J. Chem. 38, 2042 (1960); and Reid, "Organic Chemistry of Bivalent Sulfur," Chemical Publishing Co., Inc., New York, N.Y., vol. IV, pp. 201–204 (1962).

These known thioncarbamates containing one or more N,N-disubstituted thiocarbamoyloxy moieties attached through oxygen to an aromatic ring carbon are usually prepared by prior art processes which require a phenol, ArOH, as a reactant. Two frequently used methods can be formulated as follows:

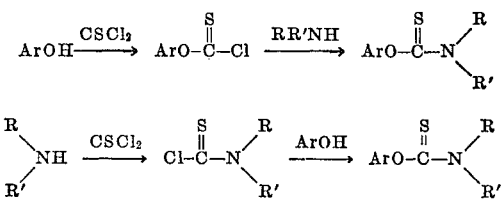

Aromatic N,N-disubstituted thiocarbamates prepared according to the novel process of this invention can be hydrolyzed or otherwise transformed, for example, by alcoholysis to the corresponding thiophenol. However, prior to the discovery of the novel process of this invention, no useful purpose would ordinarily have been served in producing thiophenols by that method because the same thionphenols were usually used to produce the thiolcarbamates. The novel process of this invention now provides an economical and highly useful synthesis route for the transformation of phenols to thiophenols, or for the replacement of an aromatic OH moiety with an SH moiety. That transformation involves three steps, (1) the transformation of a phenol to an aromatic N,N-disubstitued thioncarbamate, for example, as described above, (2) transformation of that thioncarbamate to an aromatic N,N-disubstituted thiolcarbamate by the novel process of this invention, and (3) transformation of that thiolcarbamate to a thiophenol by methods known in the art. This series of transformations can be formulated as follows:

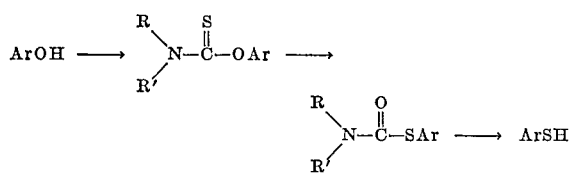

wherein Ar is the aromatic moiety attached originally to O and finally to S through an aromatic ring carbon atom, and wherein R and R' are the moieties attached to N as described hereinabove.

This novel route to thiophenols is somewhat similar to a prior art route involving the so-called "Schönberg rearrangement of dialkylthioncarbonates to diarylthiolcarbonates. See Al-Kazimi et al., J. Am. Chem. Soc. 77, 2479 (1955), and references cited therein. That prior art route has been formulated as follows:

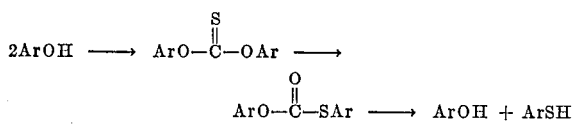

It will be noted that only half of the phenol reactant, ArOH, is transformed to a thiophenol, ArSH, and that the latter is contaminated with an equal amount of the phenol reactant. In striking contrast, the novel route described hereinabove has the substantial advantage of transforming all of the phenol reactant to a pure thiophenol product.

When the novel process of this invention is used in this three-step transformation of a phenol to a thiophenol, it is usually preferred that R and R' be lower alkyl since thioncarbamates containing those are usually the least expensive to produce and since the nature of R and R' is not critical beyond the limitations set forth above. When the aromatic N,N-disubstituted thioncarbamate is to be used as such, for example, for some agricultural or pharmaceutical purposes, it is to be used as a reactant in some other chemical reaction, R and R' can be varied widely within said limitation without substantial disadvantage in carrying out the novel thioncarbamate-to-thiolcarbamate rearrangement of this invention.

It should be understood that the novel process of this invention is not limited to the production of compounds containing a single carbamoylthio moiety. Compounds containing 2, 3, or more thiocarbamoyloxy moieties per molecule can be transformed by heating to compounds containing the same or a lesser number of carbamoylthio, provided only that each thiocarbamoyloxy moiety is as defined above and the entire thioncarbamate molecule is otherwise substantially unchanged by heat at the rearrangement temperature.

Another aspect of this invention relates to novel thioncarbamates of Formula III and to novel thiolcarbamates of Formula IV:

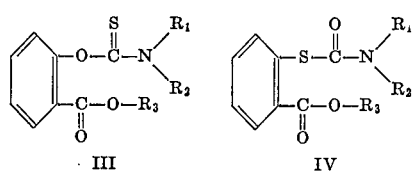

wherein $R_1$, $R_2$, and $R_3$ are lower alkyl, lower alkenyl, lower cycloalkyl, lower aralkyl, phenyl, halophenyl, nitrophenyl, lower alkylphenyl, or lower alkoxyphenyl, or wherein $R_3$ is as defined above, and $R_1$ and $R_2$ each represent lower alkylene linked together through carbon, oxygen, or nitrogen.

Formula III thioncarbamates are readily transformed to Formula IV thiolcarbamates according to the novel process of this invention. For these particular thioncarbamates, a temperature in the range about 100° to about 300° C. will usually cause substantially complete rearrangement to the thiolcarbamate within about 15 minutes to about 6 hours.

Although as mentioned above, aromatic N,N-disubstituted thioncarbamates and thiolcarbamates are known in the art, Formula III thioncarbamates and Formula IV thiolcarbamates are novel, and are useful especially as intermediates in a novel process for producing saccharin. After preparation by the novel process of this invention, the Formula IV compounds are readily transformed to saccharin by reaction first with a mixture of chlorine and water and then with aqueous ammonia, as described for analogous reactants in German Patentschrift 913,417, for example. The Formula III compounds are prepared by interaction of the appropriate salicylic acid ester and a disubstituted thioncarbamoyl chloride as follows:

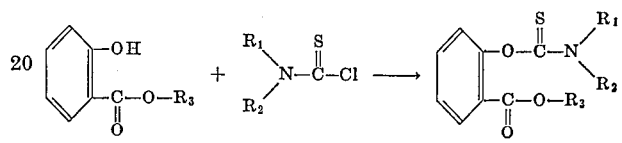

wherein $R_1$, $R_2$, and $R_3$ are as defined above.

It will be apparent from the above description of the novel process of this invention that a wide variety of thioncarbamates can be used as reactants. There are certain limitations on these reactants, however. As mentioned above, the N of each Formula I thiocarbamoyloxy moiety must be attached to two different carbon atoms. Each of those carbon atoms must either be saturated with hydrogen atoms, other carbon atoms, or a combination of those, or must be an aromatic ring carbon atom. Thus the simplest moiety which can be attached to the N is methyl, $CH_3$, which is saturated with hydrogen atoms. Examples of other simple moieties with a saturated carbon atom for attachment to N are ethyl, isopropyl, and tert-butyl. Moiety carbon atoms not attached directly to the N need not be saturated with hydrogen atoms or other carbon atoms, and may be unsaturated or substituted with other atoms or groups of atoms.

Examples of aromatic ring carbon atoms are the ring carbon atoms of phenyl, naphthyl, tolyl, anisyl, nitrophenyl, and pyridyl.

Two separate moieties or a single divalent moiety as described above can be attached to N of the thiocarbamoyloxy moiety. When there are two separate moieties, they can be alike or different, and both can be attached through saturated carbon atoms or aromatic ring carbon atoms, or there can be one of each type of attachment. If a single divalent moiety is attached to N of the thiocarbamoyloxy moiety, it must be attached through two different carbon atoms. Examples of such divalent moieties are ethylene, trimethylene, tetramethylene, pentamethylene, 3-oxapentamethylene, and the like, as well as such moieties substituted with or attached to other atoms or groups of atoms.

Although, as pointed out above, substantially any moieties within the above limitations can be attached to the N of the Formula I thiocarbamoyloxy moieties in thioncarbamates useful as reactants of the novel process of this invention, it is preferred that the thiocarbamoyloxy moieties have the formula:

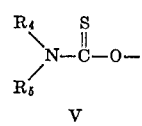

wherein $R_4$ and $R_5$, which can be the same or different, are alkyl, alkenyl, alkynyl, cycloalkyl, cycloalkenyl, aryl, aralkyl, or aralkenyl, unsubstituted or substituted with one or more, preferably one to three, substituents including fluorine, chlorine, bromine, iodine, alkyl, alkenyl, alkoxy, alkylthio, alkoxycarbonyl, carboxyl, nitro, cyano, carboxyacylamido, amino, alkylamino, dialkylamino, carboxyacyl, hydroxy, and the like, with the proviso that the point of attachment of each $R_4$ and $R_5$ to N is a carbon atom saturated with hydrogen atoms, other carbon atoms, or a combination of those, or is an aromatic ring carbon atom. Alternatively, $R_4$ and $R_5$ together can be alkylene, oxaalkylene, azaalkylene, or thiaalkylene, unsubstituted or substituted with one or more, preferably one to three, of the substituents mentioned above as permissible on separate $R_4$ and $R_5$ moieties, and with the above-defined proviso as to the points of attachment to N.

Examples of alkyl are methyl, ethyl, propyl, butyl, pentyl, hexyl, heptyl, octyl, nonyl, decyl, undecyl, dodecyl, tridecyl, tetradecyl, pentadecyl hexadecyl, heptadecyl, octadecyl, and isomeric forms thereof. Examples of alkenyl are allyl, 1-methylallyl, 2-methylallyl (methallyl), 2-butenyl (crotyl), 3-butenyl, 1,2-dimethylallyl, 2-ethylallyl, 1-methyl-2-butenyl, 2-methyl-2-butenyl, 3-methyl-2-butenyl, 3-pentenyl, 2,3-dimethyl-2-butenyl, 1,3-dimethyl-2-butenyl, 1-ethyl-2-butenyl, 4-methyl-2-pentenyl, 5-hexenyl, 3-heptenyl, 4-octenyl, 10-dodecenyl, 9-octadecenyl, and the like. Examples of alkynyl are 2-propynyl (propargyl), 1-methyl-2-propynyl, 2-butynyl, 3-butynyl, 1-methyl-2-butynyl, 1-methyl-3-butynyl, 3-pentynyl, 1,2-dimethyl-3-butynyl, 4-pentynyl, 2-methyl-3-pentenyl, 3-hexynyl, 7-octynyl, 5-dodecynyl, 9-octadecynyl, and the like. Examples of cycloalkyl are cyclopropyl, cyclobutyl, cyclopentyl, cyclohexyl, cycloheptyl, cyclooctyl, cyclononyl, cyclodecyl, and the like, as well as bicyclic and tricyclic moieties which may be considered as having been derived by removal of a hydrogen atom from such bicyclic and tricyclic hydrocarbons as bicyclo[2.2.1]heptane, bicyclo[3.2.1]octane, decalin, bicyclo[2.2.2]octane, and perhydrophenanthrene. Examples of cycloalkenyl are 2-cyclopentenyl, 3-cyclopentenyl, 2-cyclohexenyl, 3-cyclohexenyl, 2-cycloheptenyl, 4-cycloheptenyl, 3-cyclooctenyl, 5-cyclodecenyl, and the like. Examples of aryl are phenyl, 1-naphthyl, 2-naphthyl, and the isomeric forms of biphenyl, terphenyl, phenanthryl, anthryl, acenaphthenyl, fluorenyl, fluoroanthenyl, pyrenyl, chrysenyl, naphthacenyl, and the like. Examples of aralkyl are benzyl, phenethyl, 1-phenylethyl, 2-phenylpropyl, 3-phenylpropyl, 4-phenylbutyl, 10-phenyldecyl, 1-naphthylmethyl, 2-(2-naphthyl)propyl, 4-(9-anthryl) butyl, and the like. Examples of aralkenyl are 3-phenylallyl, 4-(1-naphthyl)-2-butenyl, 2-methyl-3-(4-phenanthryl) 5-hexenyl, and the like.

Regarding the above-named examples of substituents, examples of alkyl are as given above. Examples of alkenyl include those given above and also 1-alkenyl, e.g., vinyl, 1-butenyl, 1-ethyl-1-butenyl, 1-hexenyl, and the like. Examples of alkoxy are methoxy, ethoxy, propoxy, isopropoxy, butoxy, isobutoxy, tert-butoxy, pentyloxy, 2-methylpentyloxy, hexyloxy, 3-ethylheptyloxy, octyloxy, and the like. Examples of alkylthio are methylthio, ethylthio, propylthio, isopropylthio, butylthio, sec-butylthio, pentylthio, hexylthio, 2-ethylheptylthio, and the like. Examples of alkoxycarbonyl are methoxycarbonyl, ethoxycarbonyl, pentyloxycarbonyl, nonyloxycarbonyl, and the like. Examples of carboxyacylamido are acetamido, propionamido, butyramido, octanoylamido, acrylamido, crotonamido, benzamido, p-nitrobenzamido, furamido, 4-quinolinecarboxamido, and the like. Examples of alkylamino are methylamino, ethylamino, isopropylamino, pentylamino, decylamino, and the like. Examples of dialkylamino are dimethylamino, N-methylethylamino, diethylamino, N-methylpropylamino, dibutylamino, N-ethylhexylamino, dioctylamino, and the like. Examples of carboxyacyl are acetyl, propionyl, butyryl, decanoyl, benzoyl, p-chlorobenzoyl, 2-naphthoyl, furoyl, isonicotinoyl, and the like.

With regard to the aromatic portion, i.e., that attached to O in the thioncarbamate and subsequently to S in the thiolcarbamate, the only criteria are that the attachment to O be through an aromatic ring carbon and that the entire thioncarbamate not undergo gross decomposition at the necessary elevated rearrangement temperature. The term "gross decomposition" is defined as deep-seated structural change involving substantially complete breakdown of the thioncarbamate reactant into substantially smaller molecular and/or atomic fragments. As will be apparent to those skilled in the art, thioncarbamates containing such moieties as ozonide, azide, and peroxide are likely to undergo gross decomposition before the rearrangement temperature is reached. Such thioncarbamates are, of course, inoperable as reactants in the novel process of this invention. On the other hand, the fact that a particular thioncarbamate undergoes relatively minor structural changes, for example, dehydration, decarboxylation, dehydrohalogenation, isomerization, recemization, and the like while the thiocarbamoyloxy moieties are being rearranged to carbamoylthio moieties, does not prevent that particular thioncarbamate from being useful as a reactant in the novel process of this invention.

Examples of aromatic moieties which can be attached to O in thioncarbamates especially suitable as reactants in the novel process of this invention are the examples of aryl given above, either unsubstituted or substituted as described above, as well as those same unsubstituted or substituted aryl moieties with one or more additional hydrogen atoms removed from aromatic ring carbon atoms, and also heterocyclic moieties which can be considered as derived by removal of one or more hydrogen atoms from aromatic ring carbon atoms of such as pyridine, quinoline, isoquinoline, acridine, phenanthridine, pyridazine, pyrimidine, phenazine, phenothioxin, dibenzofuran, dibenzothiophene, and the like, unsubstituted or substituted with the substituents listed above.

The novel process of this invention is easily carried out merely by heating the aromatic N,N-disubstituted thioncarbamate reactant at a temperature which will cause substantially complete rearrangement within a reasonable length of time, but yet which is not so high as to cause gross decomposition of the thioncarbamate reactant or the thiolcarbamate product. For relatively small scale experiments of the type described hereinafter, a convenient temperature is that which will cause substantially complete rearrangement within about 20 to about 30 minutes. Such temperatures will usually range from about room temperature, i.e., about 25° C., to above 300° C., the necessary temperature being dependent largely on the nature of the aromatic portion of the thioncarbamate reactant and to a much lesser extent on the nature of the N substituents of that reactant. The rearrangement will proceed more rapidly at high temperatures than at low temperatures. As will be apparent to those skilled in the art, mixing and heat transfer problems are often greater with larger scale reactions, and lower reaction temperatures with corresponding longer reaction times are then usually preferred.

Since most organic compounds react with oxygen at elevated temperatures, it is desirable to carry out this rearrangement in the absence of oxygen. This can be done merely by sweeping air from the reaction vessel with a stream of an inert gas, for example, nitrogen, helium, or argon, and then maintaining a slight positive pressure of the inert gas in the reaction vessel during the heating period.

Usually it is not necessary to use a diluent, and the undiluted thioncarbamate is merely heated, usually above its melting temperature, until rearrangement occurs. Relatively polar diluents, for example, sulfolane, N,N-dialkylformamides, and alkylcapped polyoxyalkylenes can be used, and their use is sometimes advantageous, for example, with thioncarbamates of high melting point. In some instances such polar solvents will increase the yield of the desired thiolcarbamate product, perhaps by reducing undesired intermolecular reactions, although the rate of the desired rearrangement reaction is usually not substantially changed thereby.

In some instances, the presence of a catalytic or larger amount of an acidic substance will accelerate the rate of this novel rearrangement and will make possible a lower rearrangement temperature. Examples of such substances are anhydrous acids, e.g., hydrogen chloride and hydrogen bromide; acyl halides, e.g., acetyl chloride and benzoyl chloride; and Lewis acids, e.g., boron trifluoride. The nature of this effect is not completely understood and its operation is not always predictable. However, it does appear that an acidic substance will usually be most effective when it can reduce the electron density at the aromatic carbon atom attached to O in the thiocarbamoyloxy moiety (Formula I). Such instances can readily be foreseen by one skilled in this art.

The course of the rearrangement can readily be followed by analysis of small portions of the reaction mixture at frequent intervals during the heating. Infrared analysis will show gradual disappearance of strong absorption bands in 1530–1560 cm.$^{-1}$ region and the 1190–1320 cm.$^{-1}$ region, and gradual appearance of strong bands in the 1650–1670 cm.$^{-1}$ region as the rearrangement progresses.

The rearrangement can also be followed by nuclear magnetic resonance spectral measurements, observing gradual disappearance of a doublet at 7.3–7.5$\tau$ and gradual appearance of a singlet at 7.0–7.1$\tau$ as the rearrangement progresses.

The rearrangement can also be followed by thin layer chromatography. Especially useful for that purpose are silica gel plates with a mixture of dichloromethane and methanol (19:1). The thioncarbamate reactant is usually less polar than the thiolcarbamate product, and, with that system, the thioncarbamate usually moves more rapidly than the thiolcarbamate. For example, in that system, m-nitrophenyl dimethylthioncarbamate and m-nitrophenyl dimethylthiolcarbamate, 3-phenanthryl dimethylthioncarbamate and 3-phenanthryl dimethylthiolcarbamate, and o-methoxyphenyl dimethylthioncarbamate and o-methoxyphenyl dimethylthiolcarbamate each have $R_f$ values 0.6 and 0.3, respectively, while 1,4-phenylenebis(dimethylthioncarbamate) and 1,4-phenylenebis(dimethylthiolcarbamate) have $R_f$ values 0.2 and 0, respectively. In each case, the thioncarbamate spot will gradually disappear from chromatograms of successive portions taken from the reaction mixture during heating, while the thiolcarbamate spot will simultaneously gradually increase to a spot of maximum intensity.

After one or more of the above-described analysis methods indicates substantially complete or the desired conversion of thioncarbamate to thiolcarbamate, the latter can be isolated by conventional methods. It is often advantageous to distill the desired thiolcarbamate directly from the rearrangement reaction mixture, preferably under reduced pressure. Alternatively, the desired thiolcarbamate is isolated by fractional extraction, crystallization from a suitable solvent or mixture of solvents, chromatography, or a combination of those. The thiolcarbamate can then, if desired, be purified by conventional methods, for example, by fractional distillation, by recrystallization from a suitable solvent or mixture of solvents, by chromatography, or by a combination of those.

As mentioned above, the aromatic N,N-disubstituted thiolcarbamates prepared by the novel process of this invention can, if desired, be transformed to the corresponding thiophenols. It is usually satisfactory to do that by reaction of the thiolcarbamate with a mixture of aqueous sodium or potassium hydroxide and sufficient of a water-miscible organic solvent such as methanol or ethanol to give a homogeneous reaction mixture. The resulting thiophenol is then isolated by acidification of the reaction mixture, followed by removal of the organic solvent, and then filtration or extraction with a water-immiscible solvent.

The novel process and novel saccharin intermediates of this invention can be more fully understood by the following preparations and examples.

Preparation 1.—p-Acetylphenyl dimethylthioncarbamate

Sodium hydride (10.5 g.) was added in small portions to an ice-cooled solution of p-hydroxyacetophenone (54.4 g.) in 300 ml. of dimethylformamide. When evolution of hydrogen had ceased, the solution was cooled to 13° C., and dimethylthiocarbamoyl chloride (65.0 g.) was added all at once. The resulting mixture was stirred for 45 minutes and allowed to warm to 45° C. The solution was then heated to 80° C. and maintained there with stirring for 15 minutes. Slow addition of one l. of water caused precipitation of a solid which was filtered, washed with 3 l. of water, and dried to give 73 g. of a cream-colored solid. That solid was recrystallized four times from ethanol to give 54 g. of pale yellow crystalline p-acetylphenyl dimethylthioncarbamate; M.P. 99–103° C.

Following the procedure of Preparation 1, the following thioncarbamates were prepared:

o-acetylphenyl dimethylthioncarbamate; M.P. 68–70° C.
3-phenanthryl dimethylthioncarbamate; M.P. 107–108° C.
p-methoxyphenyl dimethylthioncarbamate; M.P. 82–84° C.
p-acetamidophenyl dimethylthioncarbamate; M.P. 185.5–187.5° C.
p-hydroxyphenyl dimethylthioncarbamate; M.P. 123–126° C.
2,6-di-tert-butyl-4-methylphenyl dimethylthioncarbamate; M.P. 120–121° C.
o-methoxyphenyl dimethylthioncarbamate; M.P. 61–62° C.
m-trifluoromethylphenyl dimethylthioncarbamate; M.P. 64–65° C.
o-nitrophenyl dimethylthioncarbamate; M.P. 121–125° C.
p-aminophenyl dimethylthioncarbamate; M.P. 115–118° C.
p - dimethylaminophenyl dimethylthioncarbamate; M.P. 104–106° C.
m-dimethylaminophenyl dimethylthioncarbamate; M.P. 82–84° C.
2,4,5-trichlorophenyl dimethylthioncarbamate; M.P. 139–142° C.
2,4,5-trichlorophenyl diethylthioncarbamate; M.P. 119–123° C.
3,5-xylyl dimethylthioncarbamate; B.P. 140–145° C. at 3 mm.
3,5-xylyl diethylthioncarbamate; M.P. 47–49° C.
p-(dimethylthiocarbamoyloxy)phenyltrimethylammonium iodide; M.P. 182–184° C.
o-acetoxyphenyl dimethylthioncarbamate; M.P. 102–104° C.
1,4 - phenylenebis(dimethylthioncarbamate); M.P. 214–216° C.
1,4-phenylenebis(diethylthioncarbamate); M.P. 156–160° C.
1,2 - phenylenebis(dimethylthioncarbamate); M.P. 112–113° C.
4 - (2 - methylthiopyrimidinyl) dimethylthioncarbamate; M.P. 80–81° C.
17-oxoestra-1,3,5(10)-trien-3-yl dimethylthioncarbamate; M.P. 215–219° C.
17 - hydroxyestra - 1,3,5(10)-trien-3-yl dimethylthioncarbamate; M.P. 198–204° C.
17 - acetoxyestra-1,3,5(10)-trien-3-yl dimethylthioncarbamate; M.P. 182–185° C.

Preparation 2.—p-Tert-butylphenyl dimethylthioncarbamate

Dry sodium p-tert-butylphenolate (17.6 g.) was added all at once to a stirred solution of dimethylthiocarbamoyl chloride (21.0 g.) in 140 ml. of dimethylformamide at 14° C. The temperature of the mixture rose rapidly to 26° C. The mixture was stirred at 30–34° C. for 90 minutes, and was then poured into 300 ml. of water. That mixture was extracted twice with 300 ml. of a mixture of benzene and commercial hexane (4:1). The combined extracts were washed successively with water, 5% aqueous potassium hydroxide solution, and saturated aqueous sodium chloride solution. After filtration through anhydrous magnesium sulfate, the solvent was removed by distillation to give 22.6 g. of a yellow solid. That solid was recrystallized from 100 ml. of methanol to give 21.4 g. of white crystalline p-tert-butyl-phenyl dimethylthioncarbamate; M.P. 97–99° C.

Preparation 3.—3-pyridyl dimethylthioncarbamate

Sodium hydride (17 g.) was added in small portions to an ice-cooled solution of 3-pyridinol (58 g.) in 450 ml. of dimethylformamide. When evolution of hydrogen had ceased, the solution was cooled to 10° C., and dimethylthiocarbamoyl chloride (100 g.) was added all at once. The temperature of the mixture rose rapidly to 25° C. and then slowly to 40° C. The mixture was then stirred and heated to 80° C. during one hour. That mixture was cooled and poured into 2 l. of 1% aqueous potassium hydroxide solution. The resulting solution was saturated with sodium chloride and then extracted with two 1-l. portions of a mixture of benzene and commercial hexane (4:1). The combined extracts were washed successively with one l. of water and 800 ml. of 5% hydrochloric acid. The acid washing was cooled and neutralized with 10% aqueous potassium hydroxide. The resulting dark red oil was extracted with one l. of a mixture of benzene and commercial hexane (4:1). That extract was washed with saturated aqueous sodium chloride solution, and was then filtered through anhydrous magnesium sulfate. Evaporation gave 98 g. of a dark oil which was distilled under reduced pressure to give 95 g. of pale yellow liquid 3-pyridyl dimethylthioncarbamate; B.P. 125–130° C. at 0.4 mm.

Preparation 4.—4-pyridyl dimethylthioncarbamate

4(1H)pyridone (32 g.) was dissolved in a solution of sodium hydroxide (13.2 g.) in 200 ml. of water. The resulting solution was mixed with a solution of silver nitrate (56 g.) in 200 ml. of water. The solid precipitate which formed was filtered and washed with 400 ml. of acetone. That washed precipitate was then suspended in a solution of 1,4-diazabicyclo[2.2.2]octane (56 g.) in 300 ml. of dimethylformamide. To that mixture, dimethylthiocarbamoyl chloride (62. g.) was added all at once. The resulting mixture was stirred for one hour. About 250 ml. of dimethylformamide was then removed by distillation under reduced pressure, and the residue was cooled and filtered through a 6 mm. layer of diatomaceous earth (Celite). That layer was washed with 500 ml. of toluene, and the combined filtrate and washing were mixed with 2 l. of water. The mixture was extracted with one l. of toluene, and the extract was washed twice with water and dried with anhydrous magnesium sulfate. The toluene was then removed by distillation at reduced pressure to give 30 g. of a dark red oil. That oil was dissolved in 100 ml. of ethyl acetate, and the solution was cooled to −60° C. The resulting solid was filtered, washed with 50 ml. of cold ethyl acetate, and dried to give 11 g. of white crystalline 4-pyridyl dimethylthioncarbamate. Two recrystallizations from diethyl ether gave 7 g. of the same substance; M.P. 71–73° C.

Preparation 5.—2-pyridyl dimethylthioncarbamate

Sodium hydride (14.4 g.) was added in small portions to an ice-cooled solution of 2(1H)-pyridone (47.5 g.) in 400 ml. of dimethylformamide. When evolution of hydrogen had ceased, dimethylthiocarbamoyl chloride (83.1 g.) was added all at once. The resulting mixture was stirred at 30–35° C. for 2 hours, and was then filtered through a layer of diatomaceous earth (Celite). Triethylamine (30 ml.) was added to the filtrate, and the mixture was evaporated. The residue was dissolved in 500 ml. of toluene, and the resulting solution was extracted with three 300-ml. portions of saturated aqueous potassium bicarbonate solution. The toluene solution was then washed with saturated aqueous sodium chloride solution, dried with anhydrous magnesium sulfate, and evaporated under reduced pressure to give a dark oil. That oil was distilled under reduced pressure to give 46 g. of yellow solid; B.P. 150–160° C. at 0.4 mm. That solid was recrystallized 3 times from methanol to give 28 g. of white solid 2-pyridyl dimethylthioncarbamate; M.P. 74–75° C.

Preparation 6.—p-Nitrophenyl dimethylthioncarbamate

A mixture of dimethylthiocarbamoyl chloride (18.5 g.) and 1,4-diazabicyclo[2.2.2]octane (22.4 g.) was added to a solution of p-nitrophenol (13.9 g.) in 150 ml. of dimethylformamide. The resulting cloudy solution was stirred 30 minutes at 30–35° C., and then was heated to 75° C. during an additional 30 minutes. After cooling, 300 ml. of water was added, and the solid which precipitated was filtered, washed with 300 ml. of water, and dried to give 24 g. of a yellow solid. That solid was recrystallized four times from a mixture of ethanol and benzene (4:1) to give 20.8 g. of yellow crystalline p-nitrophenyl dimethylthioncarbamate; M.P. 150–153° C.

Following the procedure of Preparation 6, m-nitrophenyl dimethylthioncarbamate, M.P. 153–155° C., was prepared.

Preparation 7.—p-Tert-butylphenyl chlorothionformate

A solution of thiophosgene (34.2 g.) in 200 ml. of chloroform was added all at once to a solution of p-tert-butylphenol (30.0 g.) and sodium hydroxide (8 g.) in 200 ml. of water at 15° C. The resulting mixture was stirred one hour without external cooling. The organic layer of the resulting two-phase system was separated, dried with anhydrous magnesium sulfate, and evaporated to give a residue. That residue was distilled at reduced pressure to give 32 g. of pale yellow liquid p-tert-butylphenyl chlorothionformate; B.P. 95–110° C. at 0.2 mm.

Preparation 8.—p-Tert-butylphenyl phenylthioncarbamate

Aniline (5.6 g.) was added all at once to a solution of p-tert-butylphenyl chlorothionformate (4.5 g.) in 100 ml. of chloroform. After five minutes, the resulting mixture was evaporated at reduced pressure, and the residue was dissolved in 100 ml. of a mixture of benzene and diethyl ether (4:1). That solution was extracted successively with 5% hydrochloric acid and saturated aqueous sodium bicarbonate solution, and was then filtered through anhydrous magnesium sulfate. The filtrate was evaporated and the residue recrystallized three times from 75-ml. portions of methanol to give 2.6 g. of p-tert-butylphenyl phenylthioncarbamate; M.P. 142–144° C.

Following the procedures of Preparations 7 and 8, the following thioncarbamates were prepared using p-nitrophenol or p-tert-butylphenol in Preparation 7, and N-methyl-p-nitroaniline, N-methylaniline, or morpholine in Preparation 8:

p-nitrophenyl methyl(p-nitrophenyl)thioncarbamate; M.P. 196–203° C.
p-nitrophenyl oxydiethylenethioncarbamate; M.P. 186–191° C.
p-tert-butylphenyl oxydiethylenethioncarbamate; M.P. 135–137° C.
p-nitrophenyl methylphenylthioncarbamate; M.P. 124–127° C.

Preparation 9.—p-Benzoyloxyphenyl dimethyl thioncarbamate

A solution of p-hydroxyphenyl dimethylthioncarbamate in 50 ml. of chloroform was mixed with benzoyl chloride (2 ml.) and pyridine (2 ml.). After 15 minutes, 100 ml. of water was added with agitation. The chloroform layer was separated and washed successively with 5% aqueous potassium bicarbonate solution and water. Evaporation of the solvent then gave an oil which was crystallized from methanol to give 0.5 g. of white crystalline p-benzoyloxyphenyl dimethylthioncarbamate; M.P. 158–160° C.

Preparation 10.—o-Acetylphenyl dimethylthioncarbamate cyclic ethylene acetal (o-(2-methyl-1,3-dioxolan-2-yl)-phenyl dimethylthioncarbamate)

A mixture of o-acetylphenyl dimethylthioncarbamate (95 g.), ethylene glycol (80 ml.), concentrated sulfuric acid (3 drops), and 50 ml. of benzene was refluxed 24 hours, water formed being removed by a phase separator. To the resulting mixture was added 300 ml. of 10% aqueous potassium bicarbonate solution. The organic layer which formed was separated, washed successively with water and saturated aqueous sodium chloride solution, and filtered through anhydrous magnesium sulfate. The filtrate was evaporated to give 90 g. of a dark oil. That oil was recrystallized three times from methanol to give 60 g. of white crystalline o-acetylphenyl dimethylthioncarbamate cyclic ethylene acetal; M.P. 78–80° C.

Example 1.—o-Methoxycarbonylphenyl dimethylthioncarbamate

Dimethylthiocarbamoyl chloride (18.5 g.) was added all at once with stirring to a solution of methyl salicylate (7.6 g.) and 1,4-diazabicyclo[2.2.2]octane (16.8 g.) in 75 ml. of dimethylformamide. The temperature of the resulting mixture rose rapidly to 50° C. and was maintained there with stirring for 5 hours. The mixture was then added to 300 ml. of water, and that mixture was extracted with 300 ml. of benzene and commercial hexane (7:3). The extract was washed successively with water, 5% hydrochloric acid, 5% aqueous sodium hydroxide solution, and water, and was then dried with anhydrous magnesium sulfate and evaporated to give 15 g. of a yellow oil. That oil was recrystallized twice from methanol to give 9.6 g. of white crystalline o-methoxycarbonylphenyl dimethylthioncarbamate; M.P. 96–98° C.

Following the procedure of Example 1, p-methoxycarbonylphenyl dimethylthioncarbamate, M.P. 100–102° C., was prepared. Acid hydrolysis of that compound (15 g.) by a 16-hour reflux in a mixture of 10% hydrochloric acid (120 ml.) and 60 ml. of methanol, followed by filtration, trituration of the filter cake with aqueous potassium bicarbonate solution, filtration, acidification of the second filtrate with acetic acid, and filtration of the resulting precipitate gave a solid which was washed with water, dried, and sublimed at 150° C. and 0.1 mm. to give 3 g. of white solid p-carboxyphenyl dimethylthioncarbamate; M.P. 231–245° C.

Also following the procedure of Example 1, but using in place of methyl salicylate, the ethyl, propyl, isobutyl, hexyl, allyl, 3-pentenyl, cyclobutyl, cyclohexyl, p-tert-butylcyclohexyl, benzyl, phenethyl, α-naphthylmethyl, phenyl, p-chlorophenyl, o-fluorophenyl, p-nitrophenyl, 3,5-xylyl, o-tolyl, and m-methoxyphenyl esters of salicylic acid, there are obtained the corresponding o-ethoxycarbonylphenyl, o-propoxycarbonylphenyl, o-isobutoxycarbonylphenyl, o - hexyloxycarbonyl, o - allyloxycarbonylphenyl, o-(3-pentenyloxycarbonyl)phenyl, o-cyclobutoxycarbonylphenyl, o-cyclohexyloxycarbonylphenyl, o-(p-tert-butylcyclohexyloxycarbonyl)phenyl, o-benzyloxycarbonylphenyl, o - phenethyloxycarbonylphenyl, o-(α-naphthylmethoxycarbonyl)phenyl, o-phenoxycarbonylphenyl, o-(p-chlorophenoxycarbonyl)phenyl, o-(o - fluorophenoxycarbonyl)phenyl, o-(p-nitrophenoxycarbonyl)phenyl, o-(3,5-xylyloxycarbonyl)phenyl, o-(o-tolyloxycarbonyl)phenyl, and o - (m - methoxyphenoxycarbonyl)phenyl dimethylthioncarbamates, respectively.

Also following the procedure of Example 1, but using in place of the dimethylthiocarbamoyl chloride, the diethyl, dipropyl, diisobutyl, dihexyl, diallyl, N-methylallyl, di-3-pentenyl, dicyclobutyl, dicyclohexyl, N-ethylcyclohexyl, dibenzyl, N-methylphenethyl, N-butylphenyl, diphenyl, N-methyl(p-chlorophenyl), di - o - fluorophenyl, N-allyl(p-nitrophenyl), di-o-tolyl, N-methylmesityl, and di-m-methoxyphenyl thiocarbamoyl chlorides, there are obtained each of the corresponding o-methoxycarbonylphenyl N,N-disubstituted thioncarbamates.

Also following the procedure of Example 1, but using in place of the combination of methyl salicylate and dimethylthiocarbamoyl chloride, each of the salicylic acid esters of the formula:

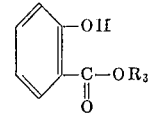

wherein $R_3$ is as defined and exemplified above is reacted with each of the N,N-disubstituted thiocarbamoyl chlorides of the formula:

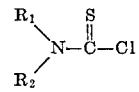

wherein $R_1$ and $R_2$ are as defined and exemplified above, to produce the corresponding o-substituted-phenyl N,N-disubstituted thioncarbamate.

Example 2.—o-Methoxycarbonylphenyl dimethylthiolcarbamate o-Methoxycarbonylphenyl dimethylthioncarbamate (15 g.) was heated under a slight positive pressure of nitrogen at 220° C. for 20 minutes. The resulting red liquid was distilled at reduced pressure to give 14.8 g. of orange liquid o-methoxycarbonylphenyl dimethylthiolcarbamate, B.P. 156–164° C. at 0.5 mm. This product had strong infrared absorption in the region 1650–1670 cm.$^{-1}$ and no significant infrared absorption in the regions 1530–1560 cm.$^{-1}$ and 1190–1230 cm.$^{-1}$.

Analysis.—Calc'd for $C_{11}H_{13}NO_3S$: C, 55.2; H, 5.5. Found: C, 55.1; H, 5.5.

Following the procedure of Example 2 but using in place of the o-methoxycarbonylphenyl dimethylthioncarbamates, each of the above-mentioned esters of the above-mentioned o - carboxyphenyl N,N - disubstituted thioncarbamates, there are obtained the corresponding esters of o-carboxyphenyl N,N-disubstituted thiolcarbamates.

Example 3.—p-Methoxycarbonylphenyl dimethylthiolcarbamate p-Methoxycarbonylphenyl dimethylthioncarbamate (10 g.) was heated under nitrogen at 220° C. for 25 minutes. The resulting clear liquid was distilled under reduced pressure to give 9.9 g. of white solid p-methoxycarbonylphenyl dimethylthiolcarbamate; B.P. 170–175° C. at 0.6 mm.; M.P. 91–93° C.

Example 4.—p-Carboxyphenyl dimethylthiolcarbamate

A solution of p-carboxyphenyl dimethylthioncarbamate (2 g.) in 4 g. of sulfolane was heated under nitrogen at 220° C. for 25 minutes. The resulting mixture was cooled to about 25° C. and mixed with 20 ml. of water. That mixture was filtered to give 1.5 g. of white solid p-carboxyphenyl dimethylthiolcarbamate; M.P. 193–196° C.

Example 5.—p-Nitrophenyl dimethylthiolcarbamate p-Nitrophenyl dimethylthioncarbamate (10 g.) was heated under nitrogen at 185–190° C. for 25 minutes. The resulting yellow liquid was cooled to give 10 g. of yellow solid; M.P. 117–120° C. Recrystallization of that solid from a mixture of benzene and ethanol (1:1) gave 8.6 g. of pale yellow crystalline p-nitrophenyl dimethylthiolcarbamate; M.P. 122–124° C.

Following the procedure of Example 5, heating p-nitrophenyl methylphenylthioncarbamate at 180° C. for 25 minutes gave p-nitrophenyl methylphenylthiolcarbamate;

M.P. 163–165° C. Also following the procedure of Example 5, heating p-nitrophenyl methyl(p-nitrophenyl)-thioncarbamate at 200° C. for 20 minutes gave p-nitrophenyl methyl(p-nitrophenyl)thiolcarbamate; M.P. 164–165° C. Also following the procedure of Example 5, heating p-nitrophenyl oxydiethylenethioncarbamate at 180° C. for 25 minutes gave p-nitrophenyl oxydiethylenethiolcarbamate; M.P. 137–149° C.

Also following the procedure of Example 5, o-nitrophenyl dimethylthioncarbamate was heated at 180° C. for 20 minutes, and m-nitrophenyl dimethylthioncarbamate was heated at 235° C. for 25 minutes to give o-nitrophenyl dimethylthiolcarbamate; M.P. 30–32° C., and m-nitrophenyl dimethylthiolcarbamate; M.P. 117–120° C., respectively.

In each of the above rearrangements according to Example 5, the yield of thiolcarbamate was about 90% or higher.

Example 6.—p-Tert-butylphenyl dimethylthiolcarbamate p-Tert-butylphenyl dimethylthioncarbamate (20 g.) was heated under nitrogen at 270° C. for 30 minutes. The resulting pale yellow oil (20 g.) was crystallized from methanol to give white crystalline p-tert-butylphenyl dimethylthiolcarbamate; M.P. 70–71.5° C.

Following the procedure of Example 6, p-tert-butylphenyl oxydiethylenethioncarbamate was heated at 270° C. for 20 minutes to give p-tert-butylphenyl oxydiethylenethiolcarbamate.

Also following the procedure of Example 6, 3,5-xylyl dimethylthioncarbamate was heated at 265–270° C. for 30 minutes, and 3,5-xylyl diethylthioncarbamate was heated at 270° C. for 25 minutes to give substantially quantitative yields of 3,5-xylyl dimethylthiolcarbamate; B.P. 140–145° C. at 3.0 mm., and 3,5-xylyl diethylthiolcarbamate; B.P. 155–160° C. at 2.0 mm., respectively.

Also following the procedure of Example 6, 4-methyl-2,6-di-tert-butylphenyl dimethylthioncarbamate was heated at 325–330° C. for 45 minutes to give a 12% yield of 4-methyl-2,6-di-tert-butylphenyl dimethylthiolcarbamate; M.P. 181–186° C.

Heating p-nitrophenyl phenylthioncarbamate at 140° C. and p-tert-butylphenyl phenylthioncarbamate at 200° C. gives only a mixture of p-nitrophenol and phenyl isothiocyanate, and a mixture of p-tert-butylphenol and phenyl isothiocyanate, respectively; no phenylthiolcarbamate could be isolated in either case. Those experiments show that thioncarbamate reactants useful in the novel process of this invention must have two carbon substituents on the carbamate nitrogen.

Example 7.—p-Methoxyphenyl dimethylthiolcarbamate p-Methoxyphenyl dimethylthioncarbamate (30.5 g.) was heated under nitrogen at 295–300° C. for 25 minutes. The resulting black liquid was distilled twice under reduced pressure to give 25.5 g. of a yellow solid; B.P. 155–165° C. at 0.8 mm. That solid was recrystallized twice from methanol to give 19 g. of white crystalline p-methoxyphenyl dimethylthiolcarbamate; M.P. 94–96° C Following the procedure of Example 7, o-methoxyphenyl dimethylthioncarbamate was heated at 280–285° C. for 25 minutes to give a 90% yield of o-methoxyphenyl dimethylthiolcarbamate; M.P. 93–95° C.

Example 8.—p-Hydroxyphenyl dimethylthiolcarbamate

A solution of p-hydroxyphenyl dimethylthioncarbamate (1 g.) in 15 ml. of sulfolane was heated under nitrogen at 278–280° C. for 20 minutes. The resulting dark solution was then cooled and dissolved in 150 ml. of a mixture of benzene and diethyl ether (4:1). That solution was extracted successively with 100 ml. of water and 80 ml. of aqueous 5% potassium hydroxide solution. The basic extract was acidified, and the solid which precipitated was filtered to give 0.2 g. of a cream-colored solid. That solid was sublimed at 165° C. and 0.2 mm. to give 0.18 g. of white solid p-hydroxyphenyl dimethylthiolcarbamate; M.P. 183–194° C.

Example 9.—p-Benzoyloxyphenyl dimethylthiolcarbamate p-Benzoyloxyphenyl dimethylthioncarbamate (0.3 g.) was heated under nitrogen at 275° C. for 20 minutes. The white solid which formed on cooling was recrystallized from methanol to give 0.13 g. of white crystalline p-benzoyloxyphenyl dimethylthiolcarbamate; M.P. 123–126° C.

Example 10.—1,4-phenylenebis(dimethylthiolcarbamate)

1,4-phenylenebis(dimethylthioncarbamate) (6 g.) was heated under nitrogen at 270° C. for 25 minutes. The grey solid (6 g.) which formed on cooling was recrystallized from benzene to give 4.9 g. of white crystalline 1,4-phenylenebis(dimethylthiolcarbamate); M.P. 200–202° C.

Following the procedure of Example 10, 1,4-phenylenebis(diethylthioncarbamate) was heated at 270° C. to give a substantially quantitative yield of 1,4-phenylenebis(diethylthiolcarbamate); M.P. 172–175° C.

Example 11.—p-Dimethylaminophenyl dimethylthiolcarbamate p-Dimethylaminophenyl dimethylthioncarbamate (4 g.) was heated under nitrogen at 295–300° C. for 20 minutes. The brown solid which formed on cooling was recrystallized from methanol to give 3 g. of pale brown crystalline p-dimethylaminophenyl dimethylthiolcarbamate; M.P. 123–128° C.

Following the procedure of Example 11, m-dimethylaminophenyl dimethylthioncarbamate was heated at 280–285° C. for 25 minutes to give a substantially quantitative yield of pale yellow liquid m-dimethylaminophenyl dimethylthiolcarbamate; B.P. 155–160° at 0.2 mm.

Example 12.—p-Acetamidophenyl dimethylthiolcarbamate

A solution of p-acetaminophenyl dimethylthioncarbamate (10 g.) in 50 ml. of sulfolane was heated under nitrogen at 280–285° C. for 25 minutes. The resulting solution was cooled and mixed with 700 ml. of water. That mixture was allowed to stand 24 hours at about 25° C. The solid which precipitated was filtered to give 9 g. of pale yellow crystalline p-acetamidophenyl dimethylthiolcarbamate; M.P. 136–138° C. Recrystallization of that solid from benzene raised its melting point to 143–145° C.

Example 13.—2,4,5-trichlorophenyl dimethylthiolcarbamate 2,4,5-trichlorophenyl dimethylthioncarbamate (10 g.) was heated under nitrogen at 220–223° C. for 25 minutes. The resulting orange liquid was distilled at reduced pressure to give 9.9 g. of white solid 2,4,5-trichlorophenyl dimethylthiolcarbamate; B.P. 153–155° C. at 0.6 mm.; M.P. 99–101° C.

Following the procedure of Example 13, 2,4,5-trichlorophenyl diethylthioncarbamate was heated at 220–225° C. for 25 minutes to give a substantially quantitative yield of white crystalline 2,4,5-trichlorophenyl diethylthiolcarbamate; M.P. 64–65° C.

Example 14.—p-Acetylphenyl dimethylthiolcarbamate p-Acetylphenyl dimethylthioncarbamate (15 g.) was heated under nitrogen at 220–225° C. for 25 minutes to give, on cooling, 15 g. of pale yellow solid p-acetylphenyl dimethylthiolcarbamate; M.P. 106–109° C.

Example 15.—o-Acetylphenyl dimethylthiolcarbamate cyclic ethylene acetal o-Acetylphenyl dimethylthioncarbamate cyclic ethylene acetal (41 g.) was heated under nitrogen at 272–274° C. for 30 minutes. The resulting blank liquid was distilled under reduced pressure to give 34 g. of orange liquid o-acetylphenyl dimethylthiolcarbamate cyclic etheylene acetal; B.P. 150–155° C. at 0.2 mm.

Example 16.—m-Trifluoromethylphenyl dimethylthiolcarbamate m-Trifluoromethylphenyl dimethylthioncarbamate (11 g.) was heated under nitrogen at 250–255° C. for 20 minutes. The resulting colorless liquid was distilled under reduced pressure to give 10.5 g. of colorless liquid m-trifluoromethylphenyl dimethylthiolcarbamate; B.P. 100–103° C. at 0.2 mm.

Example 17.—3-Phenanthryl dimethylthiolcarbamate 3-phenanthryl dimethylthioncarbamate (17 g.) was heated under nitrogen at 260° C. for 25 minutes. The yellow glass (17 g.) which resulted on cooling was crystallized from ethanol to give 14 g. of white crystalline 3-phenanthryl dimethylthiolcarbamate; M.P. 92–95° C.

Example 18.—17-Oxoestra-1,3,5(10)-trien-3-yl dimethylthiolcarbamate

A solution of 17-oxoestra-1,3,5(10)-trien-3-yl dimethylthioncarbamate (39 g.) in 30 ml. of sulfolane was heated at 270–275° C. for 40 minutes. The resulting red solution was cooled to 50° C. and added to 500 ml. of methanol. That mixture was cooled to 10° C., and the solid which formed was filtered and washed with 100 ml. of methanol. The resulting pink-white solid was recrystallized from a mixture of benzene and ethanol (1:6) to give 29 g. of white crystalline 17-oxoestra-1,3,5(10)-trien-3-yl dimethylthiolcarbamate; M.P. 180–184° C. with sintering at 174° C.

Following the procedure of Example 17, 17-hydroxyestra-1,3,5(10)-trien-3-yl dimethylthioncarbamate was heated in sulfolane solution at 280° C. for 30 minutes to give 17-hydroxyestra-1,3,5(10)-trien-3-yl dimethylthiolcarbamate; M.P. 143–145° C.

Example 19.—17-Acetoxyestra-1,3,5-(10)-trien-3-yl dimethylthiolcarbamate 17-acetoxyestra-1,3,5(10)-trien-3-yl dimethylthioncarbamate (3 g.) was heated under nitrogen at 275–280° C. for 20 minutes. The resulting pale yellow oil was recrystallized twice from ethanol to give 1.7 g. of white crystalline 17-acetoxyestra-1,3,5(10)-trien-3-yl dimethylthiolcarbamate; M.P. 178–181° C.

Example 20.—4-(2-Methylthiopyrimidinyl) dimethylthiolcarbamate 4-(2-methylthiopyrimidinyl) dimethylthioncarbamate (2 g.) was heated under nitrogen at 130° C. for 25 minutes. The resulting pale yellow solid was distilled under reduced pressure to give 1.9 g. of white solid 4-(2-methylthiopyrimidinyl) dimethylthiolcarbamate; M.P. 66–68° C.

Example 21.—2-Pyridyl dimethylthiolcarbamate 2-pyridyl dimethylthioncarbamate (10 g.) was heated under nitrogen at 210° C. for 25 minutes. The resulting dark oil was distilled under reduced pressure to give 9.6 g. of pale yellow liquid 2-pyridyl dimethylthiolcarbamate; B.P. 130–135° C. at 0.2 mm.

Example 22.—2-pyridyl dimethylthiolcarbamate

A solution of 2-pyridyl dimethylthioncarbamate (10 g.) in 50 ml. of dichloromethane was mixed with boron trifluoride etherate (7 g. of a 47% BF$_3$ solution). The resulting solution was maintained at 30° C. for 30 minutes, and was then washed successively with 50 ml. of 5% aqueous sodium hydroxide solution, water, and saturated aqueous sodium chloride solution. Removal of the solvent left a dark oil which was distilled at reduced pressure to give 7 g. of 2-pyridyl dimethylthiolcarbamate; B.P. 130–135° C. at 0.2 mm. The infrared spectrum of this material was substantially the same as that described in Example 21.

Example 23.—3-pyridyl dimethylthiolcarbamate 3-pyridyl dimethylthioncarbamate (22.2 g.) was heated under nitrogen at 255–260° C. for 30 minutes. The resulting dark liquid was distilled under reduced pressure to give 21.5 g. of yellow liquid 3-pyridyl dimethylthiolcarbamate; B.P. 125–130° C. at 0.8 mm. A short-path distillation at low pressure and 80° C. gave the same compound in solid form; M.P. 35–42° C.

Example 24.—3-pyridyl dimethylthiolcarbamate

A mixture of 3-pyridyl dimethylthioncarbamate (11 g.) and anhydrous hydrogen chloride (0.3 g.) was heated under nitrogen at 195–200° C. for 150 minutes. The resulting black oil was dissolved in 100 ml. of benzene, and the solution was washed with 50 ml. of saturated aqueous sodium bicarbonate solution, dried with anhydrous magnesium sulfate, and evaporated. The resulting black oil was distilled under reduced pressure to give 7 g. of yellow liquid 3-pyridyl dimethylthiolcarbamate; B.P. 115–120° C. at 0.2 mm. The infrared spectrum of this material was substantially the same as that described in Example 23.

Example 25.—4-pyridyl dimethylthiolcarbamate 4-pyridyl dimethylthioncarbamate (4 g.) was heated under nitrogen at 200–205° C. for 25 minutes. The resulting dark oil was distilled under reduced pressure to give 2.6 g. of yellow liquid 4-pyridyl dimethylthiolcarbamate; B.P. 120–125° C. at 0.2 mm. Successive recrystallization from diethyl ether and short-path distillation at low pressure and 80° C., gave the same compound in white crystalline form; M.P. 69–71° C.

Example 26.—4-pyridyl dimethylthiolcarbamate

A solution of 4-pyridyl dimethylthioncarbamate (8 g.) in 60 ml. of chloroform was mixed with acetyl chloride (3.6 g.). The resulting mixture was stirred for 30 minutes at about 25–30° C., and was then mixed with 100 ml. of saturated aqueous sodium bicarbonate solution. The organic layer was separated, washed with saturated aqueous sodium chloride solution, and evaporated to give a dark oil. That oil was distilled under reduced pressure to give 7 g. of pale yellow solid 4-pyridyl dimethylthiolcarbamate; B.P. 130–132° C. at 0.5 mm.; M.P. 58–62° C. The infrared spectrum of this material was substantially the same as that described in Example 25.

As discussed above, aromatic N,N-disubstituted thioncarbamates useful in the novel process of this invention must not undergo gross decomposition at a temperature which will cause rearrangement at a practical rate to the corresponding aromatic N,N-disubstituted thiolcarbamate. It was discovered that the following thioncarbamates underwent gross decomposition before that practical rearrangement temperature was reached: o-acetylphenyl dimethylthioncarbamate, o-acetoxyphenyl dimethylthioncarbamate, o-hydroxyphenyl dimethylthioncarbamate, p-aminophenyl dimethylthioncarbamate, 1,2-phenylenebis (dimethylthioncarbamate), and p - (dimethylthiocarbamoyloxy)phenyltrimethylammonium iodide. Those observations should not, however, be construed as limitations on the scope of the novel process of this invention beyond the definition of that process given hereabove. As will be apparent to those skilled in this art, an aromatic N,N-disubstituted thioncarbamate which decomposes before it rearranges to the corresponding thiolcarbamate is not included in the novel process of this invention. Whether a thioncarbamate will decompose before it rearranges is impossible to predict with certainty but can readily be ascertained by a small scale experiment.

Also as discussed above, N,N-disubstituted thiolcarbamates prepared by the novel process of this invention can be transformed by procedures known in the art to the corresponding thiophenols. Examples of that transformation are given below.

17

Example A.—p-Tert-butylbenzenethiol

A solution of p-tert-butylphenyl dimethylthiolcarbamate (21.3 g.) in 100 ml. of methanol was mixed with 100 ml. of 10% aqueous sodium hydroxide solution. The resulting mixture was stirred and heated at the boiling point under reflux in an atmosphere of nitrogen for 18 hours. The reaction mixture was then concentrated by distillation to 100 ml. and acidified with 100 ml. of 18% hydrochloric acid. The resulting oily mixture was extracted with 300 ml. of a benzene-diethyl ether mixture (4:1). The extract was washed successively with water and saturated aqueous sodium chloride solution, dried with anhydrous magnesium sulfate, and evaporated. The resulting residue was distilled at reduced pressure to give 12.6 g. of p-tert-butyl-benzenethiol; B.P. 102–105° C. at 7.5 mm.

Example B.—o-Mercaptobenzoic acid

A mixture of o-methoxycarbonylphenyl dimethylthiolcarbamate (12.8 g.), sodium hydroxide (7.5 g.), 80 ml. of methanol, and 50 ml. of water was stirred under nitrogen at 60° C. for 12 hours. The resulting solution was concentrated by distillation to 40 ml. and acidified with 10% hydrochloric acid. The solid which precipitated was filtered, washed with water, and dried to give 7.6 g. of o-mercaptobenzoic acid; M.P. 160–163° C.

Example C.—2-methylthio-4-pyrimidinethiol

A mixture of 4-(2-methylthiopyrimidinyl) dimethylthiolcarbamate (4 g.), 20 ml. of methanol, and 15 ml. of 10% aqueous potassium hydroxide solution was heated at 100° C. under nitrogen for 30 minutes. The resulting solution was cooled and mixed with 5 ml. of acetic acid. The yellow solid which precipitated was filtered, washed with water, and dried to give 2.2 g. of 2-methylthio-4-pyrimidinethiol; M.P. 186–191° C.

Example D.—3-phenanthrenethiol

A mixture of 3-phenanthoyl dimethylthiolcarbamate (11 g.), 200 ml. of ethanol, and 75 ml. of 10% aqueous potassium hydroxide solution was heated at the boiling point under reflux and in an atmosphere of nitrogen for one hour. The resulting solution was mixed with 100 ml. of water, concentrated by distillation to 150 ml., and acidified with 15 ml. of acetic acid. The oily mixture which resulted was extracted with 300 ml. of diethyl ether. The extract was washed with saturated aqueous sodium chloride solution and dried with anhydrous magnesium sulfate. Evaporation of the diethyl ether gave 8.5 g. of a pale yellow solid which was distilled at 100° C. and 0.2 mm., and then recrystallized from ethanol to give 3.7 g. of white crystalline 3-phenanthrenethiol; M.P. 110–112° C.

Example E.—o-Mercaptoacetophenone cyclic ethylene acetal

A mixture of o-acetylphenyl dimethylthiolcarbamate cyclic ethylene acetal, 200 ml. of methanol, and 60 ml. of 20% aqueous potassium hydroxide solution was heated at the boiling point under reflux and in an atmosphere of nitrogen for 6 hours. The resulting solution was cooled, mixed with 100 ml. of water, and then extracted with 100 ml. of toluene. The aqueous layer was acidified with 50 ml. of acetic acid and extracted with 200 ml. of toluene. The extract was washed successively with water and saturated aqueous sodium chloride solution, and then concentrated by distillation to give a residue which was distilled under reduced pressure to give 16 g. of yellow liquid o-mercaptoacetophenone cyclic ethylene acetal; B.P. 90–100° C. at 0.2 mm. Two crystallizations of that material from methanol gave a crystalline form of the same compound; M.P. 42–43° C.

We claim:
1. A compound of the formula:

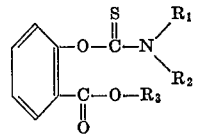

wherein $R_1$, $R_2$, and $R_3$ are lower alkyl, lower alkenyl, lower cycloalkyl, lower aralkyl, phenyl, halophenyl, nitrophenyl, lower alkylphenyl, or lower alkoxyphenyl.

2. A compound according to claim 1 wherein $R_1$, $R_2$, and $R_3$ are lower alkyl.

3. A compound of the formula:

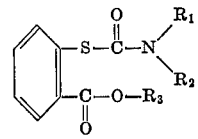

wherein $R_1$, $R_2$, and $R_3$ are lower alkyl, lower alkenyl, lower cycloalkyl, lower aralkyl, phenyl, halophenyl, nitrophenyl, lower alkylphenyl, or lower alkoxyphenyl.

4. A compound according to claim 3 wherein $R_1$, $R_2$, and $R_3$ are lower alkyl.

References Cited

Battegay et al., "Chem. Abstracts," vol. 32 (1938), p. 4950.

Al-Kazimi et al., "J.A.C.S.," vol. 77 (1955), pp. 2479–82.

CHARLES B. PARKER, Primary Examiner

D. R. PHILLIPS, Assistant Examiner

U.S. Cl. X.R.

260—609, 516, 239, 326.3, 293.4, 999, 247.1, 268, 347.2, 287, 251, 256.3 267, 327, 346.2, 330.5, 397.3, 397.4, 279, 301, 288, 294.8

UNITED STATES PATENT OFFICE
CERTIFICATE OF CORRECTION

Patent No. 3,476,791                    Dated November 4, 1969

Inventor(s) Melvin S. Newman and Harold A. Karnes

It is certified that error appears in the above-identified patent and that said Letters Patent are hereby corrected as shown below:

Column 1, line 67, for

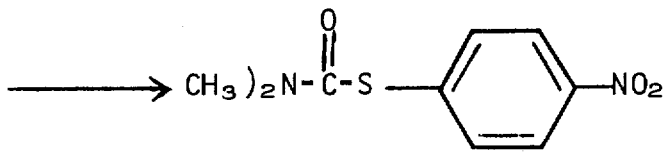

-- read --

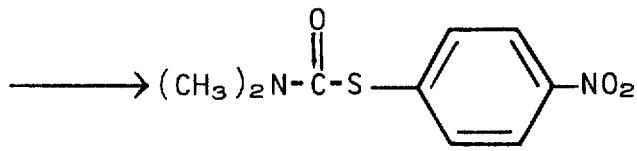

Column 2, line 31, for "German Patentschrift" read -- East German Patentschrift --; line 34 for "1830/65" read -- 18301/65 --. Column 2, line 61, for "thionphenols" read -- thiophenols --; line 67-68 for "N,N-disubstitued" read -- N,N-disubstituted --. Column 3, line 15, for ""Schönberg" read -- Schönberg --; line 16, for "dialkylthioncarbonates" read -- diarylthioncarbonates --; line 41, for "purposes, it is to be" read -- purpose, or is to be --; line 53, for "and the" read -- and that the --. Column 4, line 17, for "thioncarbamoyl" read -- thiocarbamoyl" --; line 55, for "penetamethylene" read -- pentamethylene --. Colum 5, line 15, for "pentadecyl hexadecyl" read -- pentadecyl, hexadecyl --; line 46-47, for "3-phenylol-yl" read -- 3-phenylallyl --; line 47-48, for "(4-phenanthryl)5-hexenyl" read -- (4-phenanthryl)-5-hexenyl --. Column 7, line 21, for "bands in 1530" read -- bands

UNITED STATES PATENT OFFICE
CERTIFICATE OF CORRECTION

PAGE - 2

Patent No. 3,476,791      Dated November 4, 1969

Inventor(s) Melvin S. Newman and Harold A. Karnes

It is certified that error appears in the above-identified patent and that said Letters Patent are hereby corrected as shown below:

in the 1530 --. Column 8, line 19, for "M. P." read -- m. p. -- table for "M. P." read -- m. p. --. Column 9, line 49, for "(62. g.) read -- (62 g.) --. Column 11, line 12, for "50 ml." read -- 500 ml. --. Column 12, line 30-31, for (15 g.) read -- (15.0 g.) --. Column 13, line 59, for "94-96° C" read -- 94-96° C. --. Column 14, line 74, for "blank liquid" read -- black liquid --. Column 15, line 38, for "-1,3,5-(10)-" read -- -1,3,5(10)-" --. Column 16, line 12, for "cholride" read -- chloride --. Column 18, line 25, for "and $R_3$ are lowed" read -- and $R_3$ are lower --.

SIGNED AND
SEALED
OCT 27 1970

(SEAL)
Attest:

Edward M. Fletcher, Jr.
Attesting Officer

WILLIAM E. SCHUYLER, JR.
Commissioner of Patents